(12) United States Patent
Lunati et al.

(10) Patent No.: US 9,939,059 B2
(45) Date of Patent: Apr. 10, 2018

(54) SELECTIVELY CONFIGURABLE SHIFTER ASSEMBLY ADAPTED FOR AUTOMATIC VEHICLE TRANSMISSIONS

(71) Applicant: TCI Automotive, LLC, Ashland, MS (US)

(72) Inventors: Jonathan David Lunati, Germantown, TN (US); Justin Charles Morse, Memphis, TN (US); Brian Reese, Collierville, TN (US); Cody Lyle Mayer, Germantown, TN (US)

(73) Assignee: TCI Automotive, LLC, Ashland, MS (US)

( * ) Notice: Subject to any disclaimer, the term of this patent is extended or adjusted under 35 U.S.C. 154(b) by 391 days.

(21) Appl. No.: 14/926,048

(22) Filed: Oct. 29, 2015

(65) Prior Publication Data

US 2017/0122428 A1    May 4, 2017

(51) Int. Cl.
*F16H 59/10*    (2006.01)
*F16H 59/02*    (2006.01)

(52) U.S. Cl.
CPC ......... *F16H 59/10* (2013.01); *F16H 59/0278* (2013.01); *F16H 2059/0282* (2013.01)

(58) Field of Classification Search
CPC .............. F16H 59/10; F16H 59/0278; F16H 2059/0282
See application file for complete search history.

(56) References Cited

U.S. PATENT DOCUMENTS

| 4,515,033 A | * | 5/1985 | Carlo | F16H 59/10 116/28.1 |
|---|---|---|---|---|
| 2009/0217782 A1 | * | 9/2009 | Wang | F16H 59/10 74/473.21 |
| 2014/0196559 A1 | * | 7/2014 | Wierzbowski | F16H 59/02 74/473.11 |

* cited by examiner

*Primary Examiner* — David M Fenstermacher
(74) *Attorney, Agent, or Firm* — Nelson Mullins Riley & Scarborough LLP

(57) ABSTRACT

A shifter assembly configurable for multiple automatic vehicle transmissions comprises a housing, a base mounted within the housing, a shift handle pivoted to the base, and first and second gate plates selectively mountable to the base in differing configurations cooperatively forming differing shift gates for differing gear shift patterns adapted to differing automatic vehicle transmissions for reverse or forward shift patterns. The base, handle, and gate plates are selectively mountable as a unit within the housing in differing orientations relative to a cable-receiving opening in the housing to facilitate installation within a vehicle with the cable extending from the housing in either a forward or a rearward direction.

12 Claims, 18 Drawing Sheets

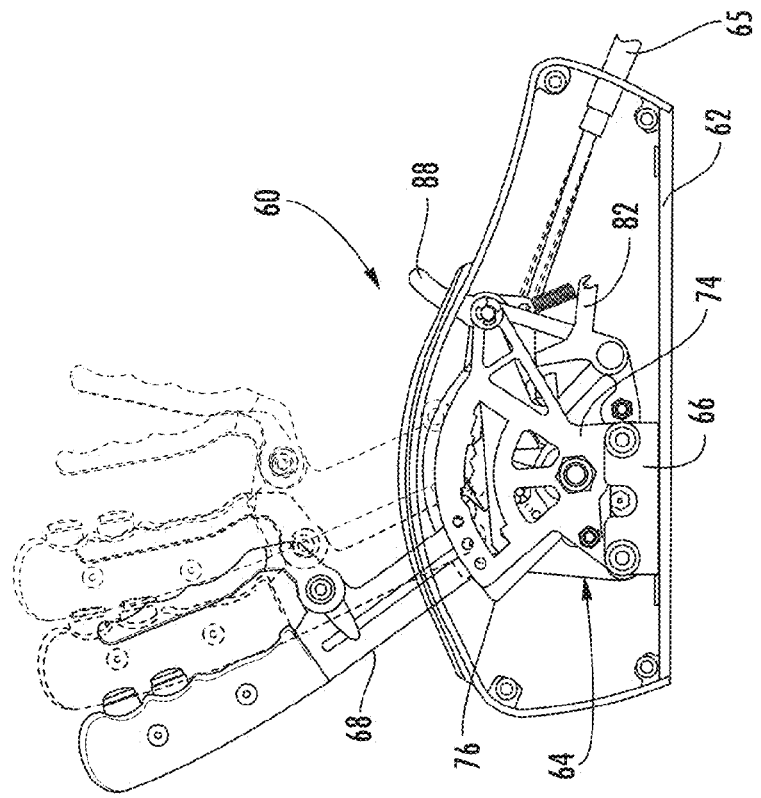
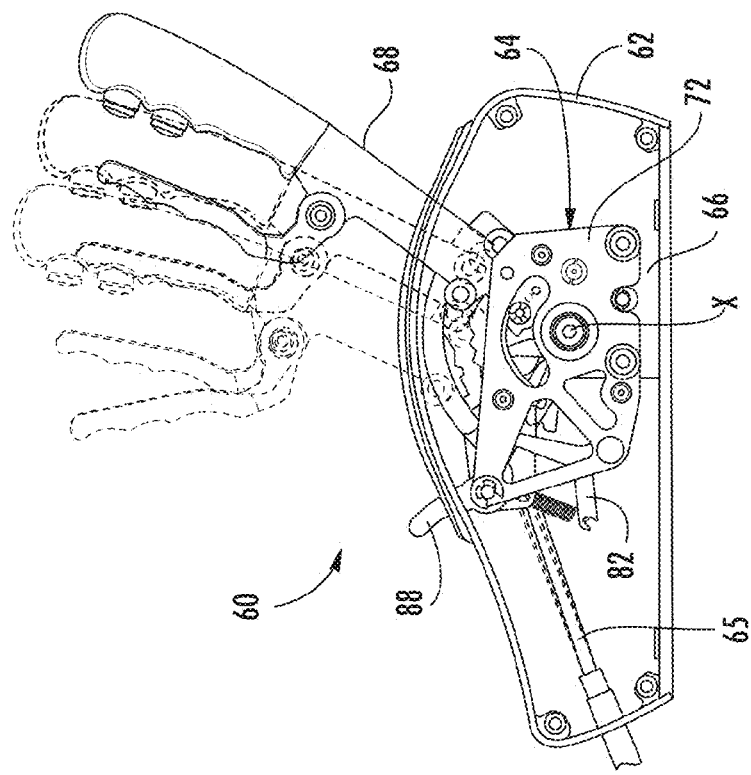

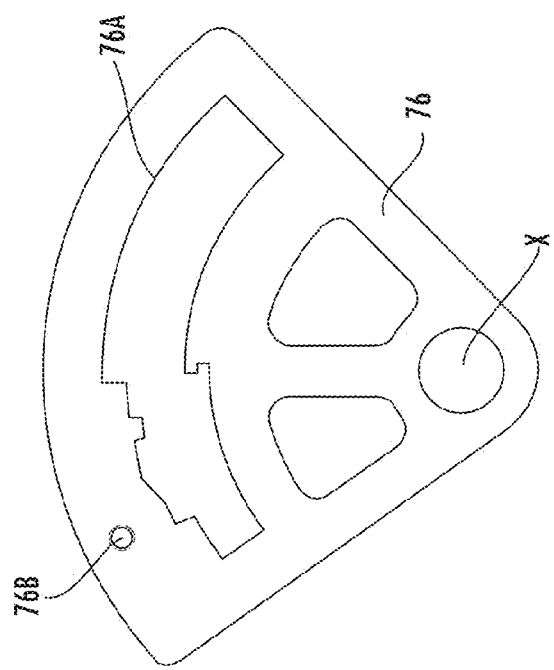
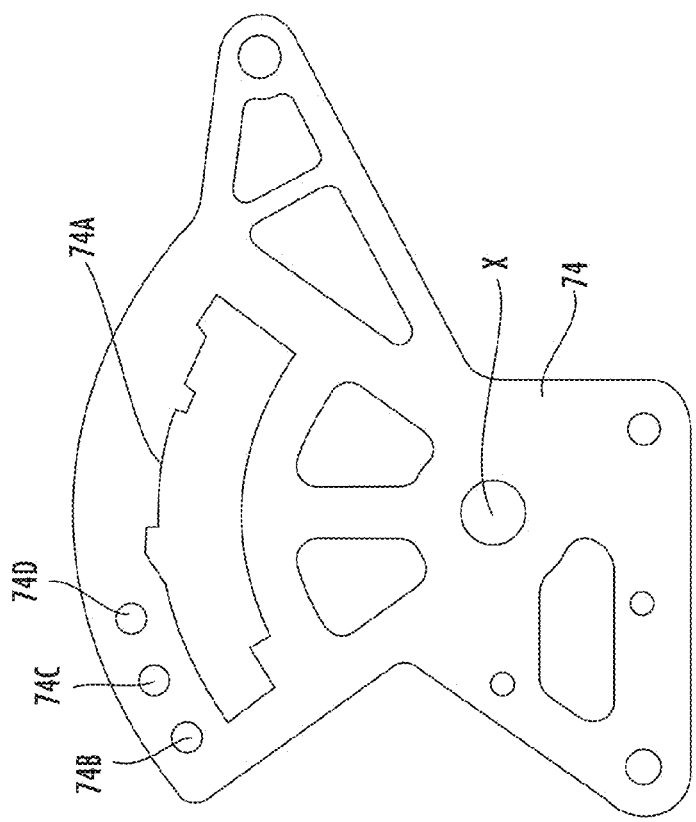

SELECTIVELY CONFIGURABLE SHIFTER ASSEMBLY ADAPTED FOR AUTOMATIC VEHICLE TRANSMISSIONS

FIELD OF THE INVENTION

The present invention relates generally to mechanical shift assemblies for use in automotive vehicles for shifting an automatic transmission between differing gear settings.

BACKGROUND OF THE INVENTION

Automobile enthusiasts commonly modify stock automobiles in various ways to improve performance and/or to adapt automobiles to uses other than ordinary transportation, e.g., for racing applications. Many such automobiles, including those used in racing, have automatic transmissions with multiple forward gear settings, commonly referred to as "speeds". The stock shifting mechanisms provided with automatic transmissions in mass produced automobiles are generally not intended nor well-suited for high-performance applications in which the driver may need or wish to use the shifting mechanism to manually sequence the transmission through its gear settings or in some applications in which a stock transmission is replaced by a transmission of a different style. Accordingly, a significant "aftermarket" industry has developed for the manufacture and sale of transmission shifter assemblies to replace stock shifters for such applications.

One of the challenges facing aftermarket manufacturers is that automatic transmissions exist in various configurations with differing forward gear settings. In high-performance and other aftermarket applications, the most common automatic transmissions tend to be so-called two-speed, three-speed and four-speed transmissions, i.e., having two, three or four forward gear settings, in addition to park, reverse and neutral settings, each of which requires a differing construction of the shifting assembly.

Further, either because of differences in transmissions among differing automobiles or different preferences of the automobile owner, the cable connecting the shifter to the transmission may extend forwardly or rearwardly from the shifter to the transmission, commonly referred to as a "front exit" or "rear exit" cable. In addition, different transmissions may utilize different valve bodies to establish a so-called forward shift pattern wherein manual shifting in sequence through the forward gears advances the shifter in a forward shifting direction relative to the front-rear orientation of the vehicle, or to establish a so-called reverse shift pattern wherein manual shifting in sequence through the forward gears advances the shifter in a rearward shifting direction. For example, for a four-speed transmission, the gear shift sequence in a forward shift pattern is Park-Reverse-Neutral-4-3-2-1 whereas by contrast the gear shift sequence in a rearward shift pattern is Park-Reverse-Neutral-1-2-3-4.

As a result, aftermarket manufacturers of automatic transmission shifter assemblies typically must produce multiple differing shifter configurations, e.g., two-speed, three-speed and four-speed shifters in front exit and rear exit cable orientations and in forward and rearward shift patterns, to accommodate the typical needs and desires of customers. The necessity of manufacturing and stocking so many differing shifter assemblies, even though having many common components, creates undesirable duplication of expense for the manufacturer. Furthermore, an automobile owner who may change from one transmission to another is often necessarily forced to purchase a new shifter assembly instead of being able to adapt his existing shifter assembly to the new transmission.

There is accordingly a need in the aftermarket automobile industry for an improved form of shifter assembly that can be adapted to differing automatic transmissions of differing gear or "speed" settings and differing transmission cable orientations.

SUMMARY OF THE INVENTION

The present invention addresses the foregoing need within the industry by providing an improved form of shifter assembly that is selectively configurable so as to be adapted for selective connection alternatively with any one of multiple automatic vehicle transmissions for shifting operation thereof.

Briefly summarized, the shifter assembly of the present invention basically comprises a shift handle for manual movement between multiple shift positions, a control plate device forming a gate defining multiple stop locations each corresponding to a respective one of the shift positions, and a gate rod affixed to the shift handle for movement with the handle sequentially between the stop locations. According to the present invention, the control plate device comprises a first gate plate formed with a first gate portion and a second gate plate formed with a second gate portion. The first and second gate plates are selectively assemblable in at least a first configuration wherein the first and second gate portions cooperatively define a first set of stop locations defining a first gear shift pattern adapted to a first automatic vehicle transmission and a second configuration wherein the first and second gate portions cooperatively define a second set of stop locations defining a second gear shift pattern adapted to a second automatic vehicle transmission.

In a contemplated embodiment, the present shifter assembly further comprises a base with the handle being pivotable relative to the base for pivoting movement between the differing shift positions. The gate plates are affixed to the base adjacent the handle in parallel facing relation to one another with the respective gate portions thereof in overlapping relation. In the first configuration, the gate portions of the gate plates are oriented in a first overlapping relationship to one another and, in the second configuration, the gate portions of the gate plates are oriented in a second overlapping relationship to one another.

More preferably, the first and second gate plates may be assemblable in a third configuration wherein the first and second gate portions cooperatively define a third set of stop locations defining a third gear shift pattern adapted to a third automatic vehicle transmission. For example, the gate portions of the gate plates in one configuration may define four stop locations corresponding to four forward gear settings of a four-speed automatic vehicle transmission, the gate portions of the gate plates in another configuration may define three stop locations corresponding to three forward gear settings of a three-speed automatic vehicle transmission, and the gate portions of the gate plates in another configuration may define two stop locations corresponding to two forward gear settings of a two-speed automatic vehicle transmission. In each of the configurations of the gates plates, the gate portions further define stop locations corresponding to park, reverse and neutral gear settings.

It is further contemplated that the shifter assembly of the present invention may further comprise a so-called "reverse lock-out" mechanism engageable with the shift handle in each configuration of the gate plates to require manual disengagement before movement of the handle from one of the forward gear settings into the reverse gear setting.

According to another aspect of the present invention, the shifter assembly includes a housing, with the base being mounted within the housing and the handle extending outwardly through the housing. An opening is provided in the housing for receiving a cable for connecting the handle to the transmission. The base is selectively mountable within the housing in a first orientation wherein a first end of the base faces the cable-receiving opening to facilitate a first selective mounting disposition of the housing within a vehicle with the cable extending in a rearward direction through the housing and a second orientation wherein a second end of the base faces the cable-receiving opening to facilitate a second selective mounting disposition of the housing within a vehicle with the cable extending in a forward direction through the housing.

BRIEF DESCRIPTION OF THE DRAWING

FIG. 8 is a left side elevational view of the transmission shifter assembly of FIG. 7;

FIG. 9 is a right side elevational view of the transmission shifter assembly of FIG. 7;

FIG. 14 is a side elevational view of one gate plate component of the transmission shifter assembly of FIG. 7;

FIG. 15 is a side elevational view of the other gate plate component of the transmission shifter assembly of FIG. 7;

DETAILED DESCRIPTION OF THE INVENTION

Figure 1:
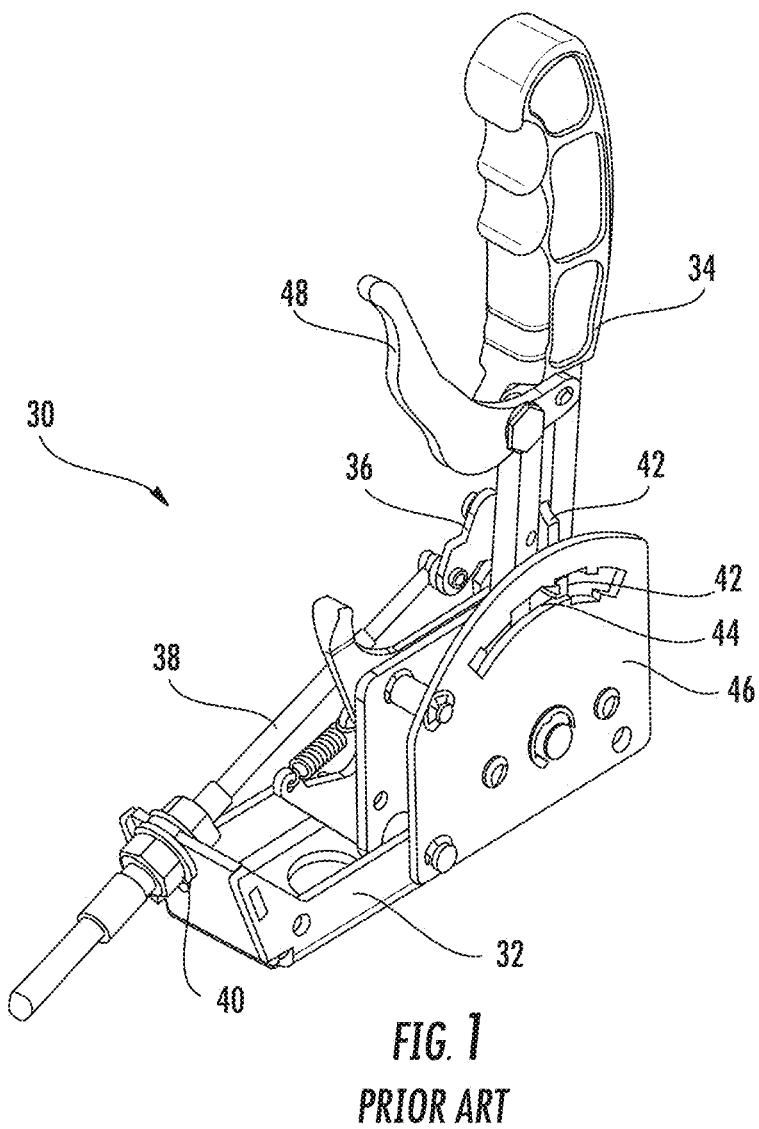
FIG. 1 is a front perspective view of a representative prior art transmission shifter assembly.

Referring now to the accompanying drawings and initially to FIGS. 1-6, a representative example of a prior art aftermarket shifter assembly of the type above-described for installation in an automobile having an automatic transmission is shown in FIG. 1 generally at 30. In the embodiment illustrated, the shifter assembly 30 is configured for use with a four-speed automatic transmission in a so-called reverse shifting pattern and with a forwardly extending front exit transmission cable orientation (not shown).

The shifter assembly 30 basically comprises a base 32 pivotably supporting an upright shifter handle 34 for forward-rearward pivotable shifting movement. The handle 34 is connected via a bracket 36 to a cable 38 affixed at 40 to the base 32 and extending therefrom to the automatic transmission (not shown). A gate rod 42 extends outwardly from the handle 34 through a slotted gate 44 in a gate plate 46 affixed in upright disposition to the base 32. The gate 44 in the gate plate 46 has a profiled configuration with multiple spaced-apart detents defining multiple stop locations engageable with the gate rod 42 for defining a gear shift pattern compatible with the automatic transmission. The gate rod 42 is spring-loaded within the handle 34, actuable via a lever 48 pivoted to the handle 34 for indexing the gate rod 42 from one stop location to another upon pivoting movement of the handle 34.

Figure 2:
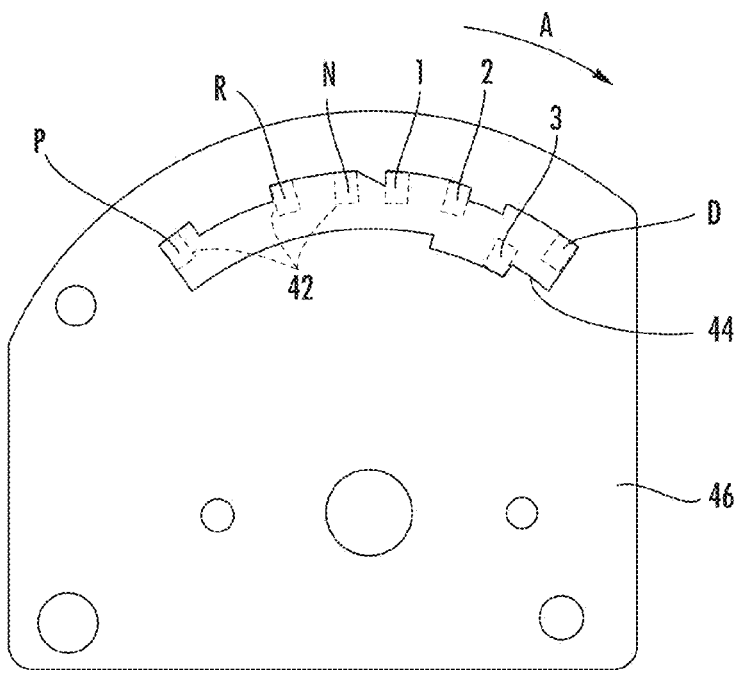
FIG. 2 is a side elevational view of the gate plate component in the transmission shifter assembly of FIG. 1.

The profile of the slotted gate 44 in the plate 46 is best seen in FIG. 2, and has stop locations at P, R, N, 1, 2, 3, D corresponding to Park, Reverse, Neutral, and first, second, third and fourth forward gear settings in a four-speed automatic transmission, such that the shifting sequence of the shifter assembly 30 has a so-called "reverse" shifting pattern in which manual shifting of the transmission through its forward gears from first to second to third to fourth gears is executed by advancing the handle 34 in a rearward shifting direction relative to the driver and the front-rear ends of the automobile so as to index the gate rod 42 in sequence through stop locations 1, 2, 3, D as indicated by directional arrow A.

Figure 3:
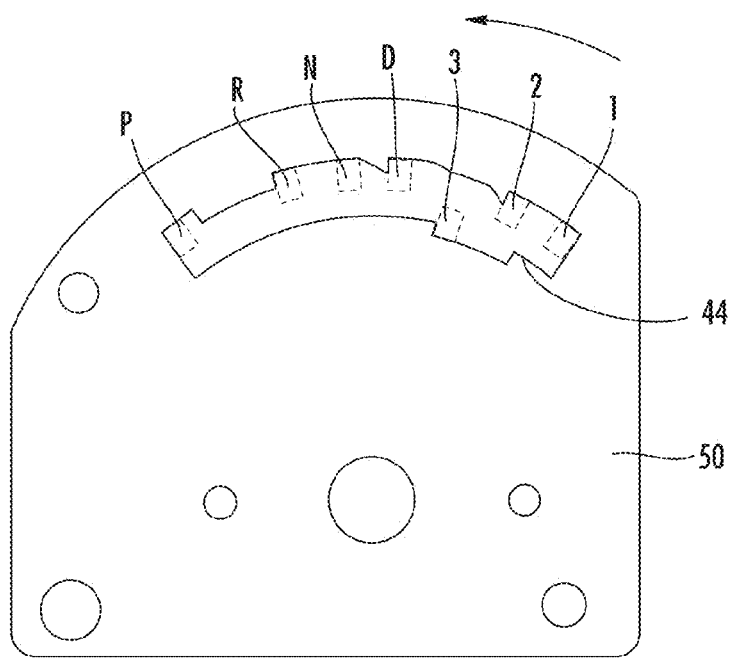
FIGS. 3-6 are similar side elevational views of alternative gate plate components used in the prior art in other transmission shifter assemblies for other transmission configurations.
Figure 4:
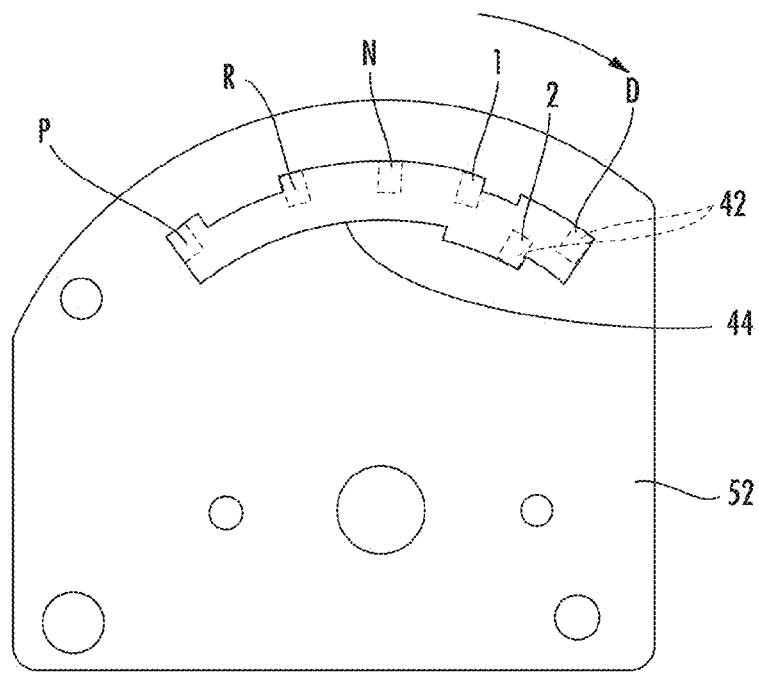
Figure 5:
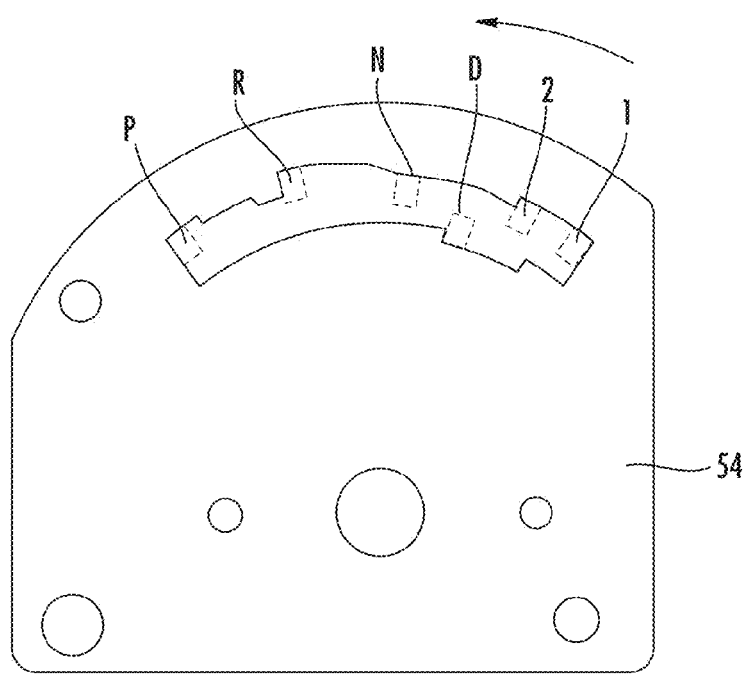
Figure 6:
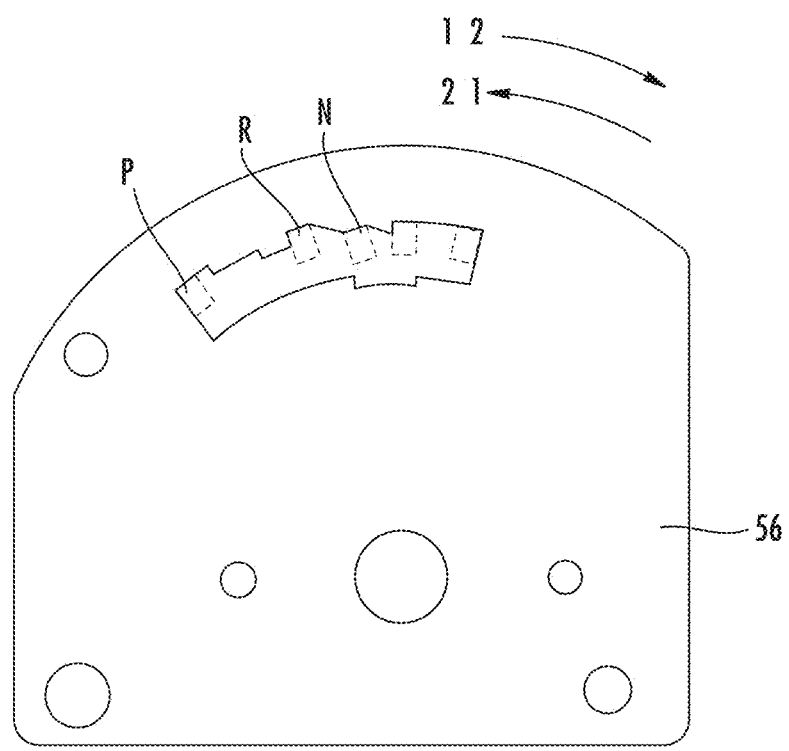

The prior art shifter assembly 30, however, is not operable with nor reconfigurable to be compatible with a four-speed automatic transmission utilizing a "forward" shifting pattern, nor three-speed or two-speed automatic transmissions in either forward or reverse shifting patterns. For such other automatic transmission applications utilizing a comparable front exit cable orientation, the shifter assembly 30 utilizes the same base 32, but different respective gate plates with different slotted gate configurations are required. FIGS. 3-6 represent prior art gate plate configurations required to accommodate such other transmission installations. FIG. 3 depicts a gate plate 50 with a slotted gate configuration adapted for a forward shifting pattern in a four-speed transmission. FIG. 4 depicts a gate plate 52 with a slotted gate configuration adapted to a reverse shifting pattern in a three-speed transmission. FIG. 5 depicts a gate plate 54 with a slotted gate configuration adapted to a forward shifting pattern in a three-speed transmission. FIG. 6 depicts a gate plate 56 with a slotted gate configuration adapted to a two-speed transmission with either a forward or reverse shifting pattern. For automatic transmission shifter applications utilizing a rearwardly extending rear exit cable orientation, a different base 32 is required to accommodate rearward extension of the cable.

By contrast to the prior art, the present invention provides a novel shifter assembly construction selectively reconfigurable without any replacement or changes in parts to adapt to any two-speed, three-speed, or four-speed automatic transmission in either a forward or reverse shifting pattern and with either a forwardly extending front exit or rearwardly extending rear exit transmission cable orientation. Turning to FIGS. 7-13, the shifter assembly of the present invention is shown generally at 60 and comprises a housing 62 containing a shift mechanism 64. The housing 62 has an outer annular body forming top, bottom, and end wall portions, enclosed laterally by side walls (shown in FIG. 11 but omitted in other views for visibility), and is formed with an opening 63 in one end wall thereof for securement of a transmission actuating cable 65 extending from the shift mechanism 64 to a transmission (not shown).

The shift mechanism 64 has a U-shaped base 66 affixed to the bottom wall of the housing 62. A handle 68 is pivoted centrally within the base 66 in an upright disposition extending upwardly through a linear slot 70 in the top wall of the housing 62. A side plate 72 is affixed in upright disposition rigidly to one side of the base 66 and a pair of gate plates 74, 76 are affixed in upright disposition in face abutment to one another and rigidly to the opposite side of the base 66. As more fully described hereinafter, each of the gate plates 74, 76 are formed with shift gates 74A, 76A in the form of respective profiled arcuate slots, which overlap with one another to cooperatively form in combination a shift gate slot with a combined profile of spaced-apart detents defining a series of stop locations representing in sequence Park, Reverse, Neutral, and two or more forward gear shift points for the associated transmission.

A cam plate 78 generally in the shape of an arcuate segment is mounted coaxially to the handle 68 for integral pivoting movement therewith. The outer arcuate periphery of the cam plate 78 is formed with a series of teeth 80 and with a reverse lock-out notch 81 adjacent the teeth 80. A follower arm 82 is pivotably mounted to a lower corner of the side plate 72 adjacent the cam plate 78 and a reverse lock-out arm 86 is similarly pivoted to an upper corner of the side plate 72 adjacent the cam plate 78. A spring 84 extends between the follower arm 82 and the lock-out arm 86 for biasing each into following engagement with the outer periphery of the cam plate 78. A lever 88 is affixed to the reverse lock-out arm 86 and extends outwardly of the housing through a slot 90 for manual pivoting operation of the lock-out arm 86 against the biasing force of the spring 84.

Figure 11:
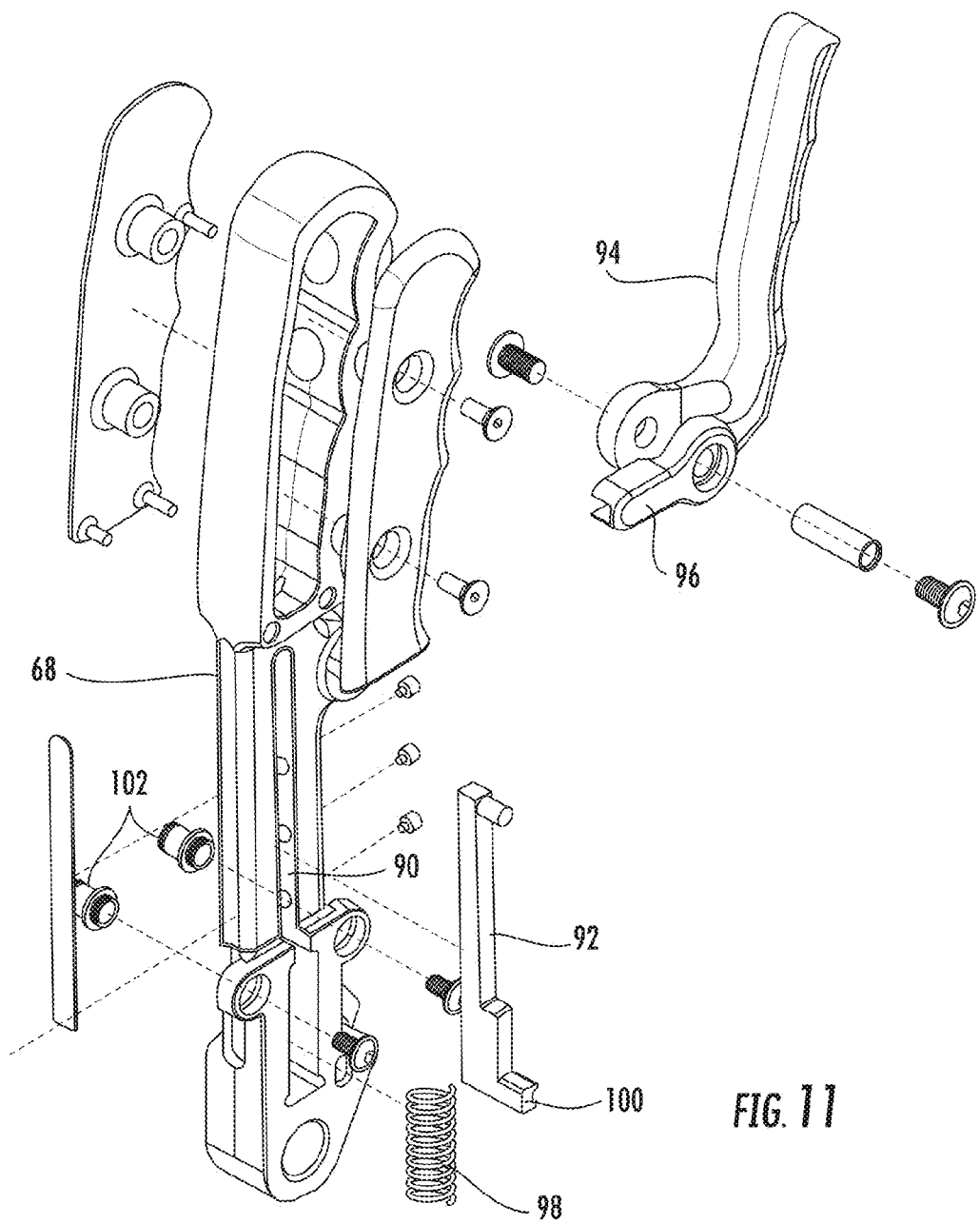
FIG. 11 is an exploded perspective view of the handle subassembly of the transmission shifter assembly of FIG. 7, taken from the opposite side perspective from FIG. 10.
Figure 12:
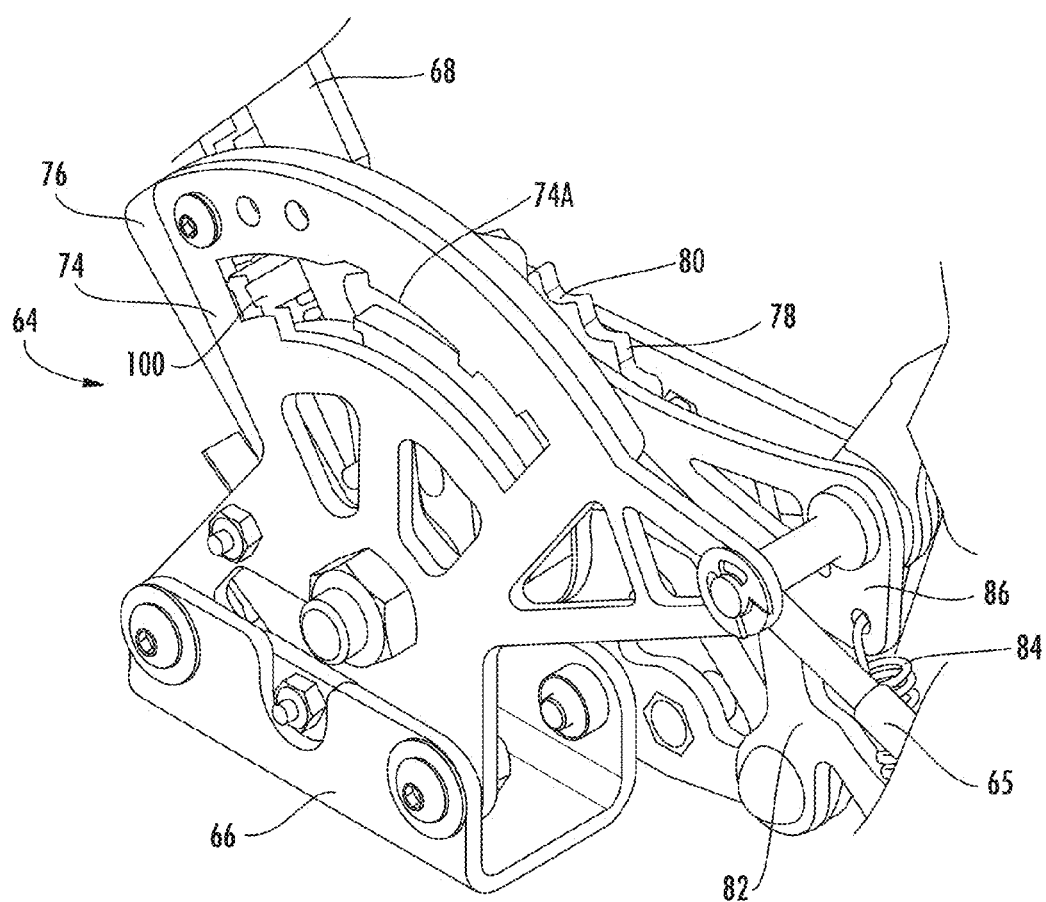
FIG. 12 is a partial enlarged right side perspective view of the internal components of the transmission shifter assembly of FIG. 7.
Figure 13:
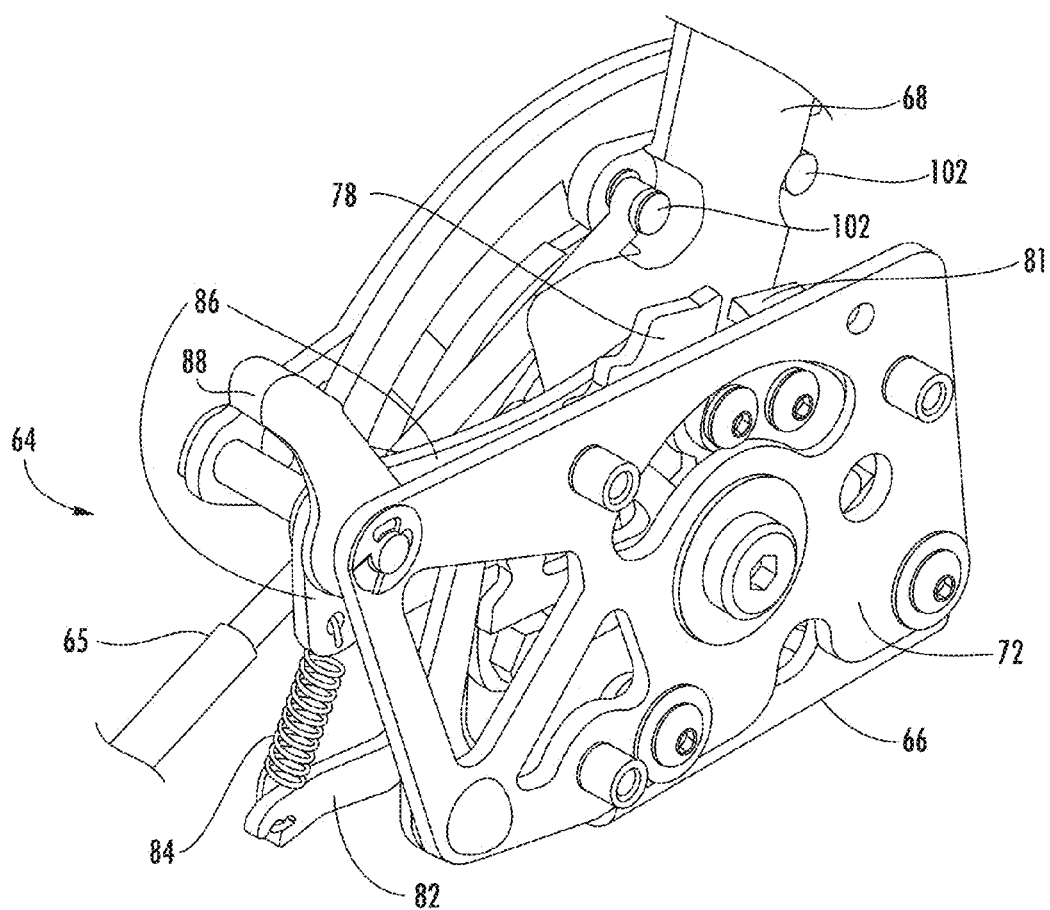
FIG. 13 is a partial enlarged left side perspective view of the internal components of the transmission shifter assembly of FIG. 7.

As best seen in FIG. 11, the side face of the handle 68 facing the gate plates 74, 76 is formed with a slotted recess in which a gate rod 92 is slidably disposed. A spring 98 is disposed within the lower end of the slot 90 in engagement against the lower end of the gate rod 92 for urging the gate rod 92 upwardly within the slot 90. An actuating lever 94 is pivoted to the handle 68 and has an arm 96 projecting into engagement with the top end of the gate rod 92 for moving the gate rod 92 within the slot against the biasing force of the spring 98. The gate rod 92 includes a laterally extending tang 100 which projects outwardly from the slot 90 through the profiled shift gates 74A, 76A in the gate plates 74, 76. A pair of stub shafts 102 are mounted at opposite forward and rearward sides of the handle 68 for connection of the transmission actuating cable 65.

The basic operation of the shifter assembly 16 may thus be understood. The handle 68 starts in a forwardmost position representing the Park condition of the associated transmission, wherein the tang 100 of the gate rod 92 rests in the stop location of the gate plates 74, 76 corresponding to the Park shift point of the transmission. The actuating lever 94 may be engaged by the driver to pivot toward the handle 68, moving the gate rod 92 downwardly against the biasing force of the spring 98 and moving the tang 100 out of the Park stop location, thereby permitting the handle 68 to move rearwardly in sequence through the Reverse stop location, the Neutral stop location and the forward gear stop locations defined by the gate plates 74, 76. The cam plate 78 moves integrally with the handle 68, with the follower arm 82 and the reverse lock-out arm 86 following the arcuate profile of the cam plate 78. The driver may then operate the automobile by manual shifting of the transmission through its forward gear settings by pivoting operation of the handle 68. Upon moving past the Reverse and Neutral stop locations into one of the forward gear stop locations, the reverse lock-out arm 86 is positioned to engage in the lock-out notch 81 of the cam plate 78 if the handle 68 is advanced forwardly into the neutral position, thereby preventing unintended shifting from one of the forward gear location into the reverse gear location. To advance the handle forwardly from the Neutral location into either the Reverse or Park locations, the driver must manually depress the lock-out lever 88 to disengage the reverse lock-out arm 86 from the lock-out notch 81.

The provision in the present invention of two overlapping gate plates 74, 76 uniquely permits the gate plates 74, 76 to be selectively adjusted into differing overlapping relationships to permit the shifter assembly 60 to be selectively reconfigured to be compatible with a variety of differing automatic vehicle transmissions having different numbers of forward gear or "speed" settings shiftable in either a reverse shift pattern or forward shift pattern. Likewise, by mounting the entire shift mechanism 64 within its own base 66, the shift mechanism 64 can be selectively mounted within the housing 62 in either of two orientations relative to the cable opening 63 to enable the shifter assembly 60 to be selectively reconfigured for mounting within an automobile with the transmission cable 65 extending forwardly or rearwardly from the shifter assembly to the transmission.

The two gate plates 74, 76 are shown separately in elevational views in FIGS. 14 and 15, respectively. As can be seen, the respective shift gates 74A, 76A have differing profiles of detents in the form of notches and protrusions that, when overlapped in differing relationships, combine to define differing collective profiles with differing numbers and spacings of notches and protrusions. The gate plate 74 of FIG. 14 is formed with a series of three openings 74B, 74C, 74D formed in an arc concentric to the pivot axis X of the handle 68, and the gate plate 76 is formed with a single opening 76B by which it can be selectively aligned with any one of the openings 74B in the gate plates 74, thereby enabling the gate plates 74, 76 to be selectively secured together, e.g., by a screw or bolt 104, through the aligned openings 74B, 76B, in any one of three differing overlapping configurations.

Figure 16:
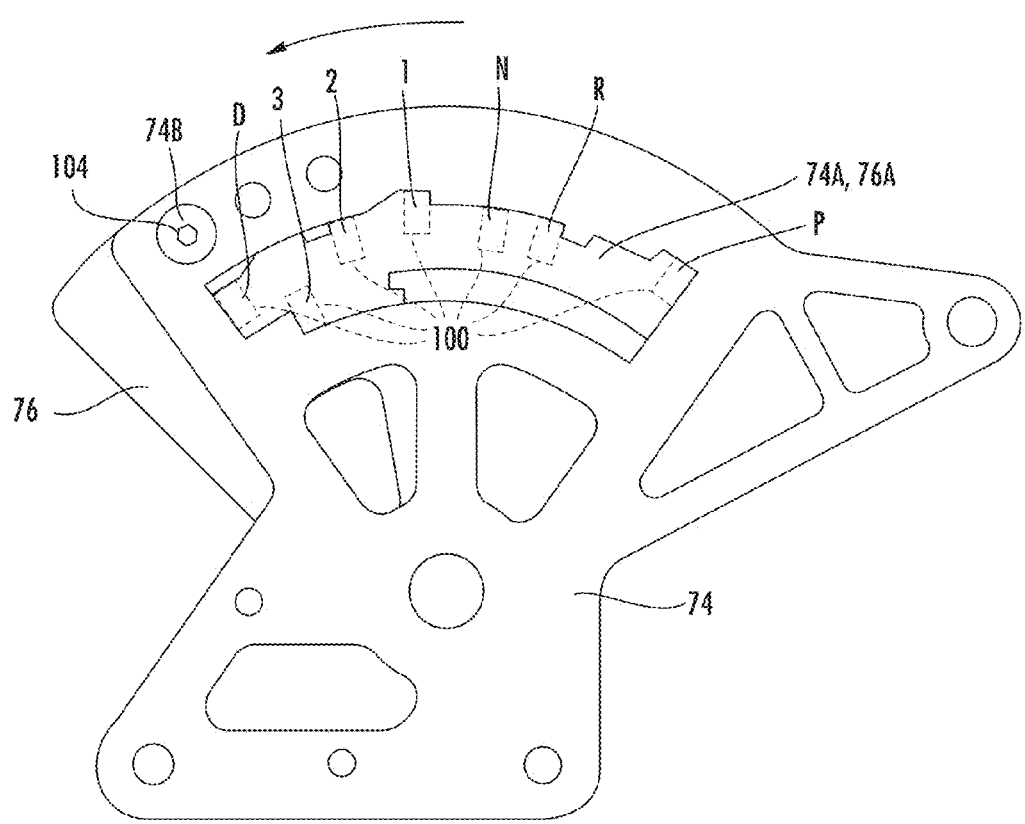
FIG. 16 is an assembled view of the gate plate components of FIGS. 14 and 15, as assembled in the configuration utilized in the transmission shifter assembly of FIG. 7.

The assembled configuration of the gate plates 74, 76 in the configuration of the shifter assembly 60 depicted in FIGS. 7-13 is shown in enlarged detail in FIG. 16, wherein the gate plates 74, 76 are assembled with their respective openings 74B, 76B aligned and secured by the screw 104. In this configuration, the shifter assembly 60 is adapted to operate in association with an automatic transmission having four forward gears, i.e., as commonly referred to as first, second, third and drive gear settings, in addition to Park, Reverse and Neutral transmission settings, and to shift among the forward gear settings in a so-called "reverse" shift pattern, i.e., with the first gear position immediately following the Neutral position, followed in sequence by the second, third and Drive positions. The respective stop positions of combined shift gates 74A, 76A of the gate plates 74, 76 followed by the tang 100 of the gate rod 92 in moving through these respective shift locations are represented at P (Park), R (Reverse), N (Neutral), 1 (first gear), 2 (second gear), 3 (third gear) and D (Drive, or fourth gear).

Figure 19:
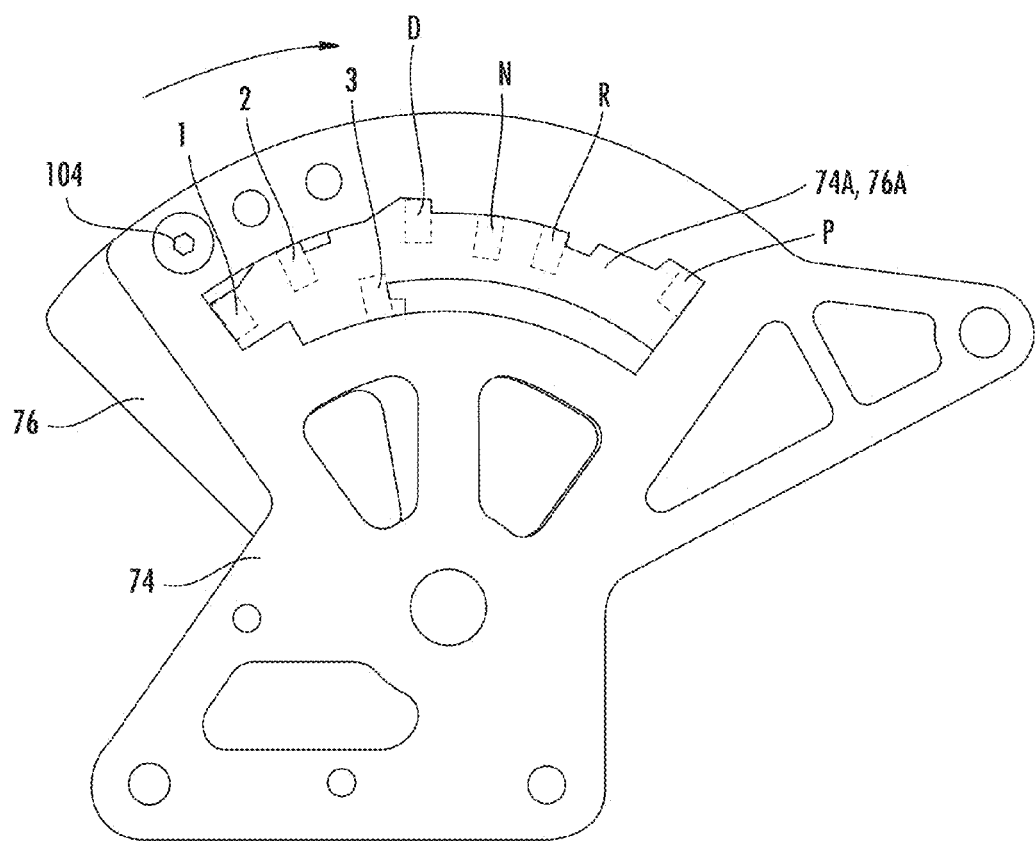
FIG. 19 is an assembled view of the gate plate components of FIGS. 14 and 15, as assembled in another possible configuration of the transmission shifter assembly of the present invention.
Figure 20:
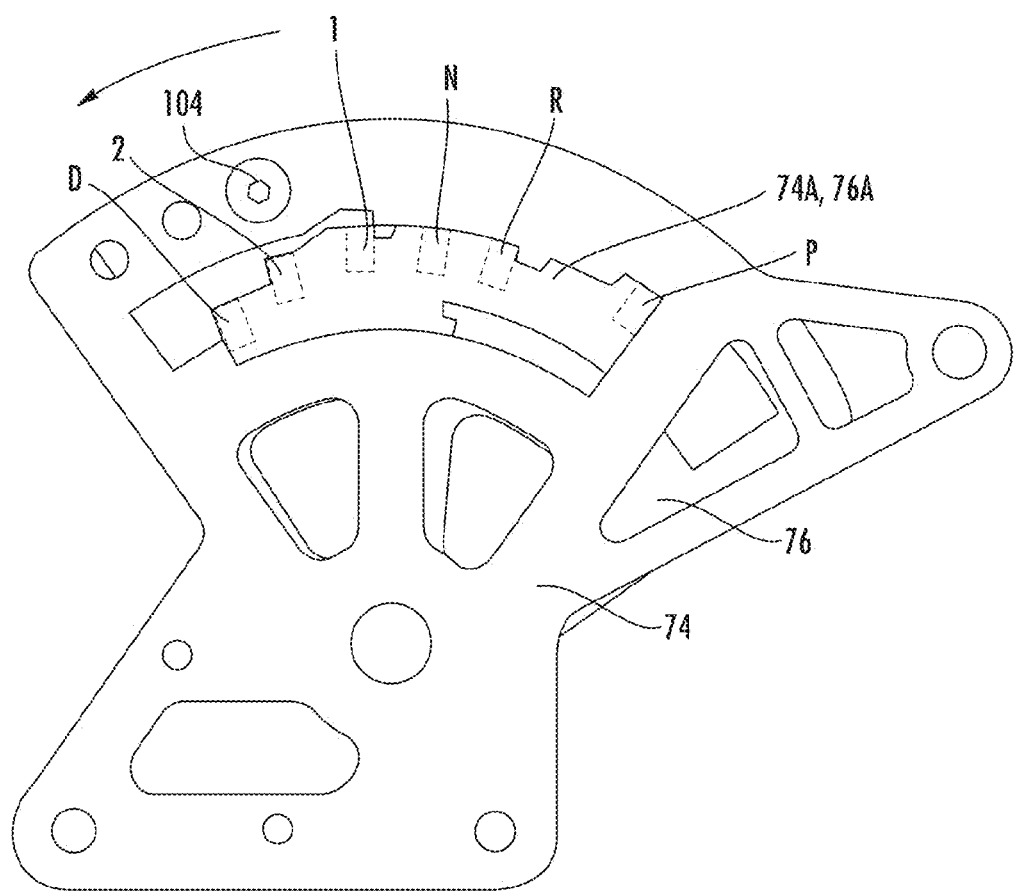
FIG. 20 is an assembled view of the gate plate components of FIGS. 14 and 15, as assembled in another possible configuration of the transmission shifter assembly of the present invention.
Figure 21:
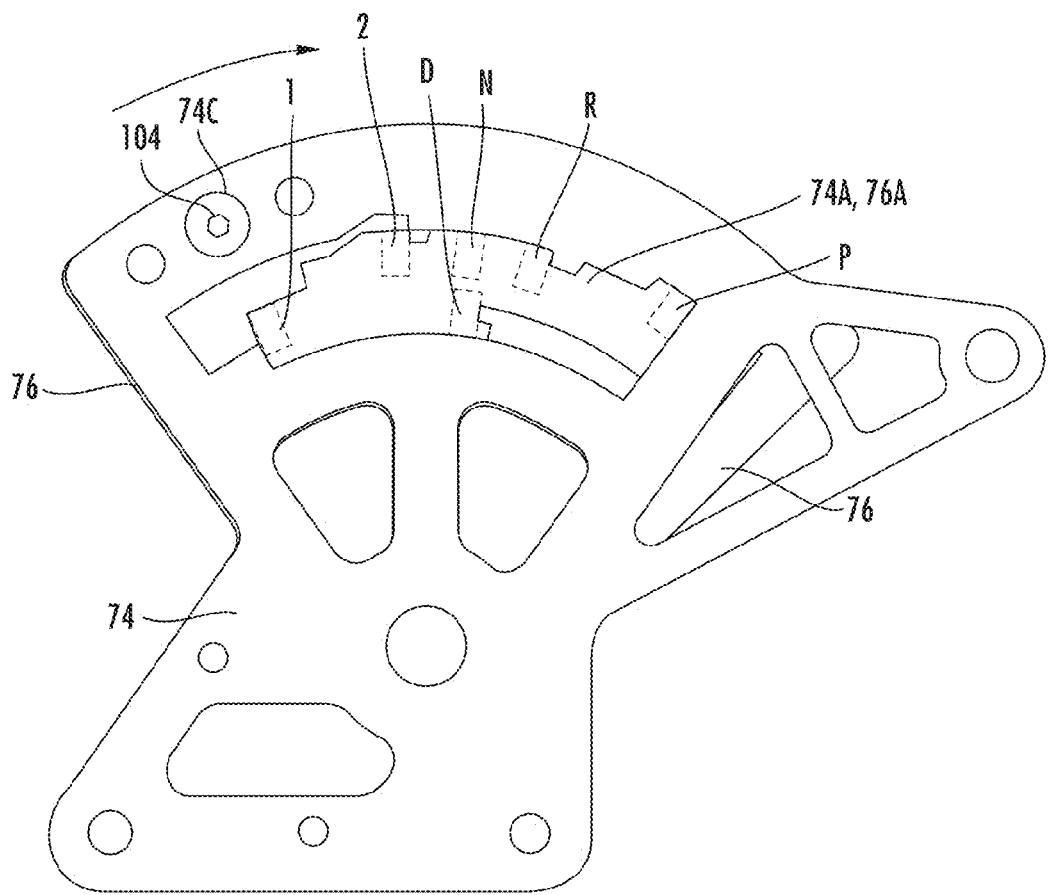
FIG. 21 is an assembled view of the gate plate components of FIGS. 14 and 15, as assembled and another possible configuration of the transmission shifter assembly of the present invention.
Figure 22:
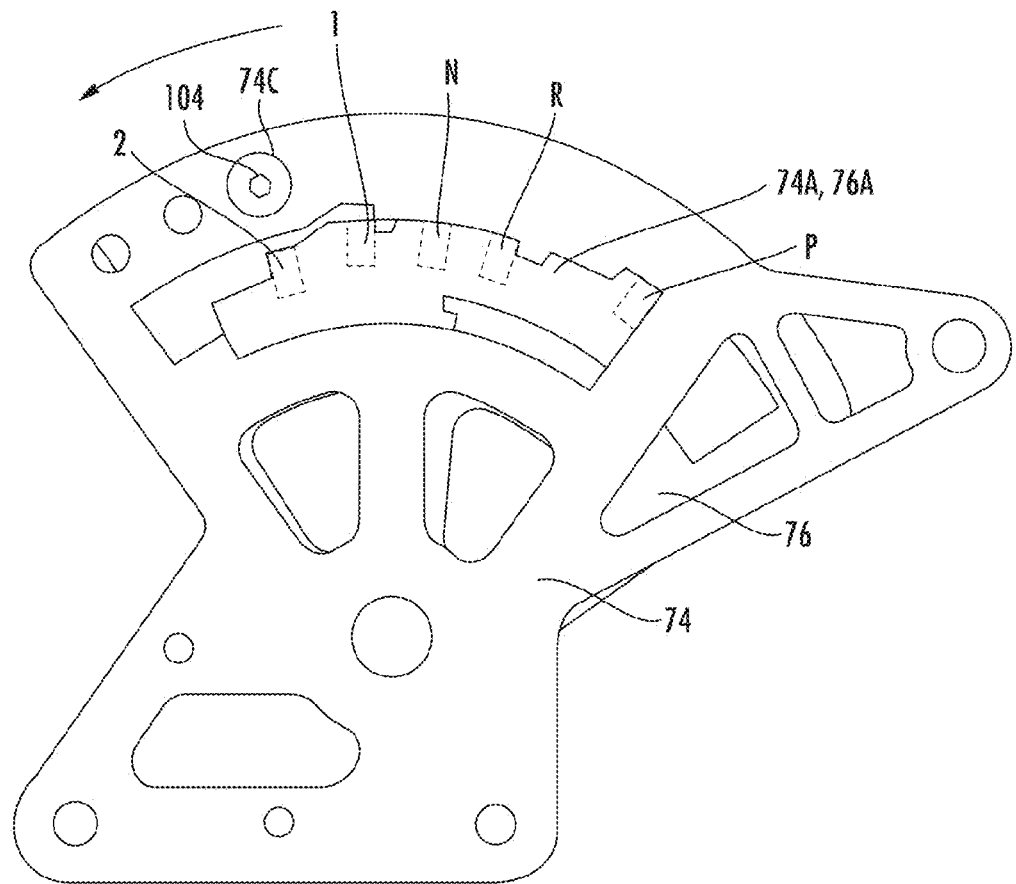
FIG. 22 is an assembled view of the gate plate components of FIGS. 14 and 15, as assembled in another possible configuration of the transmission shifter assembly of the present invention.
Figure 23:
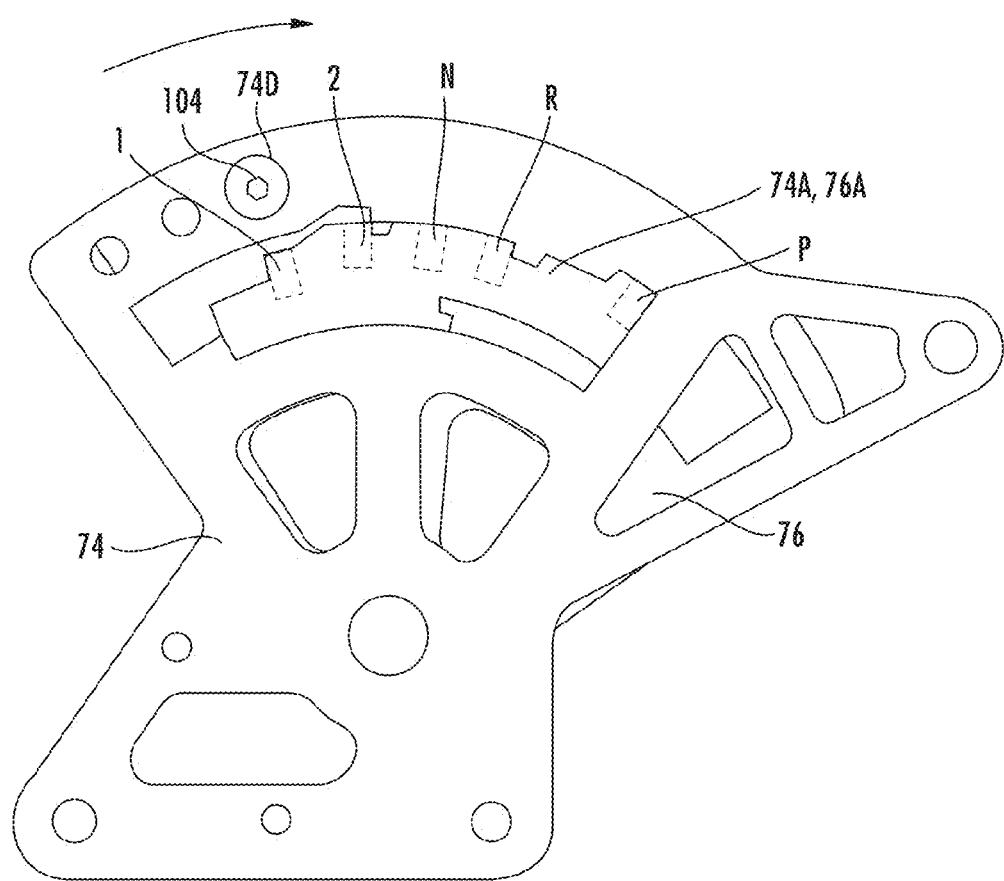
FIG. 23 is an assembled view of the gate plate components of FIGS. 14 and 15, as assembled in another possible configuration of the transmission shifter assembly of the present invention.

The unique capability of the gate plates 74, 76 to be readily reconfigured by merely by removing the screw 104 and slightly rotating the gate plate 76 to realign its opening 76B selectively with the opening 74C or 74D in the gate plates 74 enables the present shifter to also accommodate a "forward" shift pattern with a four-speed transmission or either "forward" or "reverse" shift patterns with a three-speed or two-speed transmission. FIG. 19 depicts a configuration of the gate plates 74, 76 adapted to accommodate a forward shift pattern with a four-speed transmission. As seen in FIG. 19, the overlapping orientation of the gate plates 74, 76 in this configuration is the same as in the four-speed reverse-pattern configuration of FIG. 16, but the attendant shift pattern through the forward gears 1, 2, 3, D is opposite. FIG. 20 depicts the assembled configuration of the gate plates 74, 76 to accommodate a reverse shift pattern in a three-speed transmission, which also accommodates a reverse shift pattern in a two-speed transmission as depicted in FIG. 22. FIG. 21 depicts the assembled configuration of the gate plates 74, 76 to accommodate a forward shift pattern with a three-speed transmission. FIG. 23 depicts the assembled configuration of the gate plates 74, 76 to accommodate a forward shift pattern with a two-speed transmission. The respective stop positions of the combined gates 74A, 76A are correspondingly represented at P, R, N, 1, 2, D in each Figure.

Figure 7:
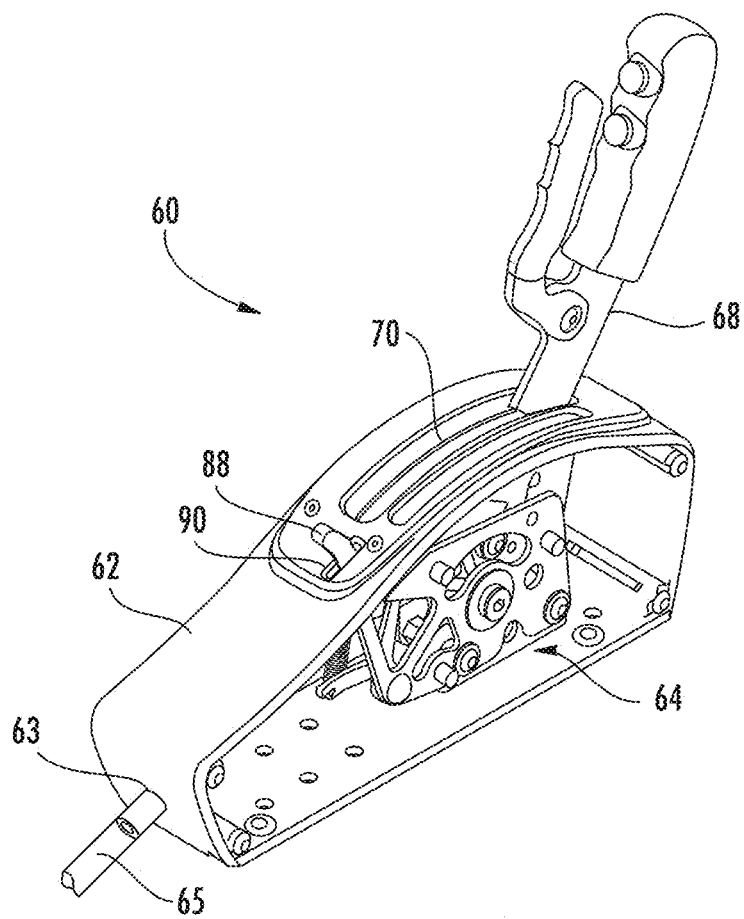
FIG. 7 is a front perspective view of a transmission shifter assembly according to the present invention in a first configuration thereof.
Figure 10:
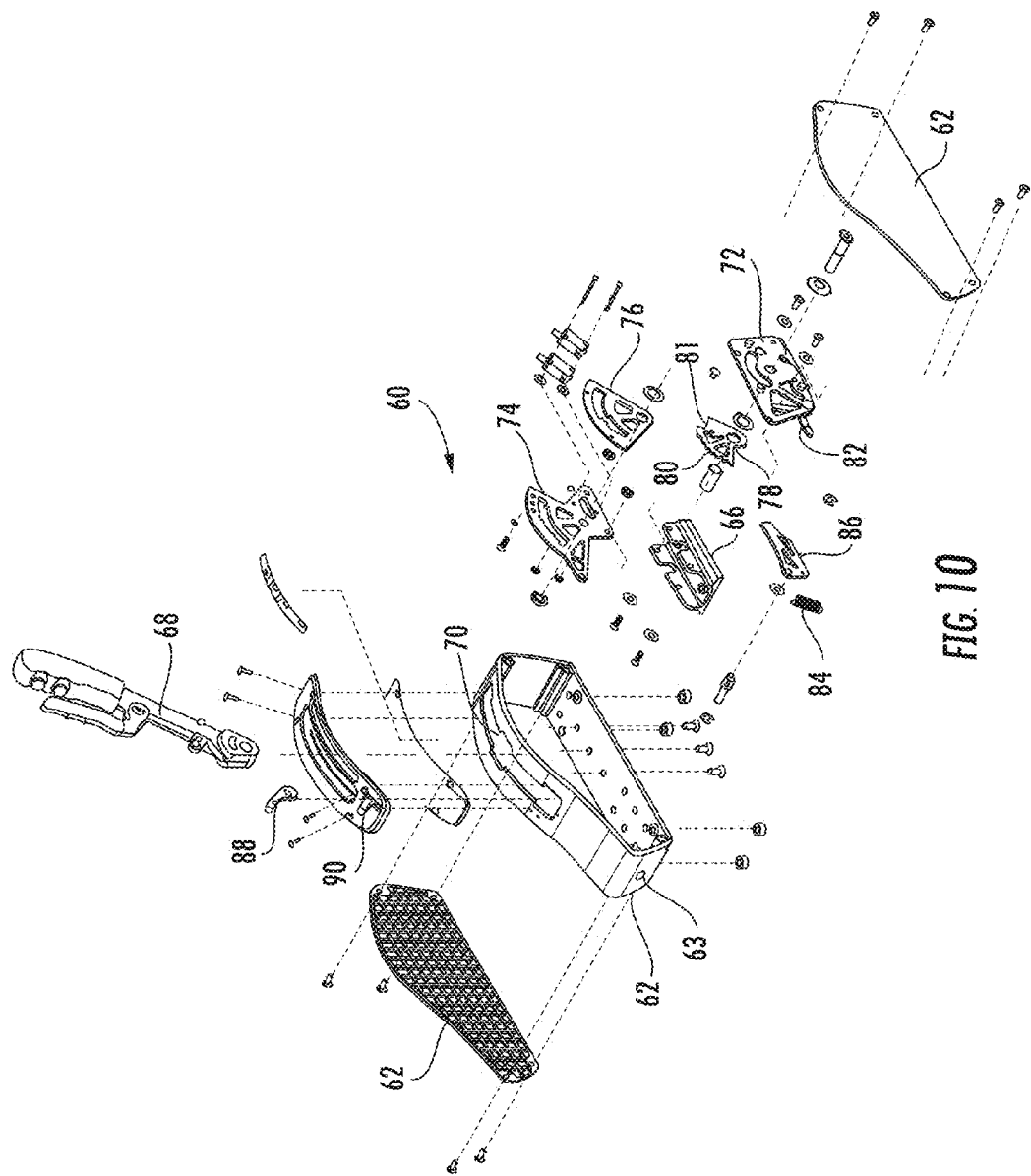
FIG. 10 is an exploded perspective view of the transmission shifter assembly of FIG. 7.
Figure 18:
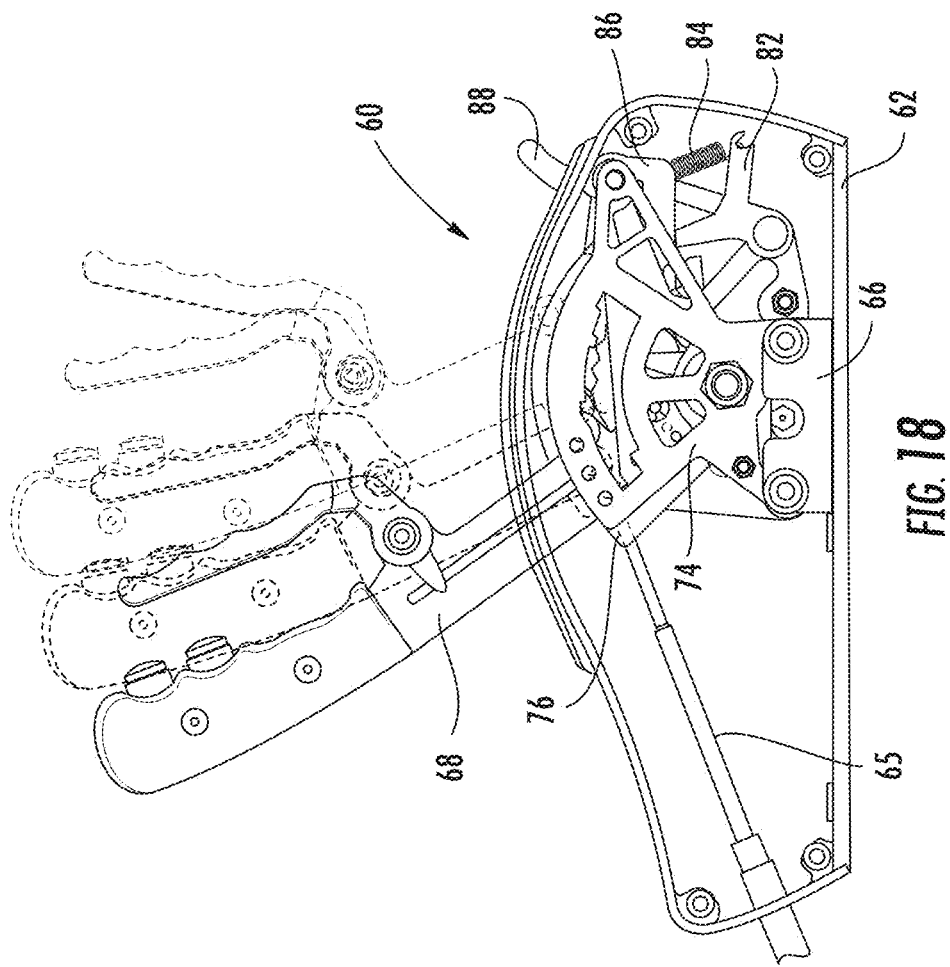
FIG. 18 is a right side elevational view of the transmission shifter assembly of FIG. 17.
Figure 17:
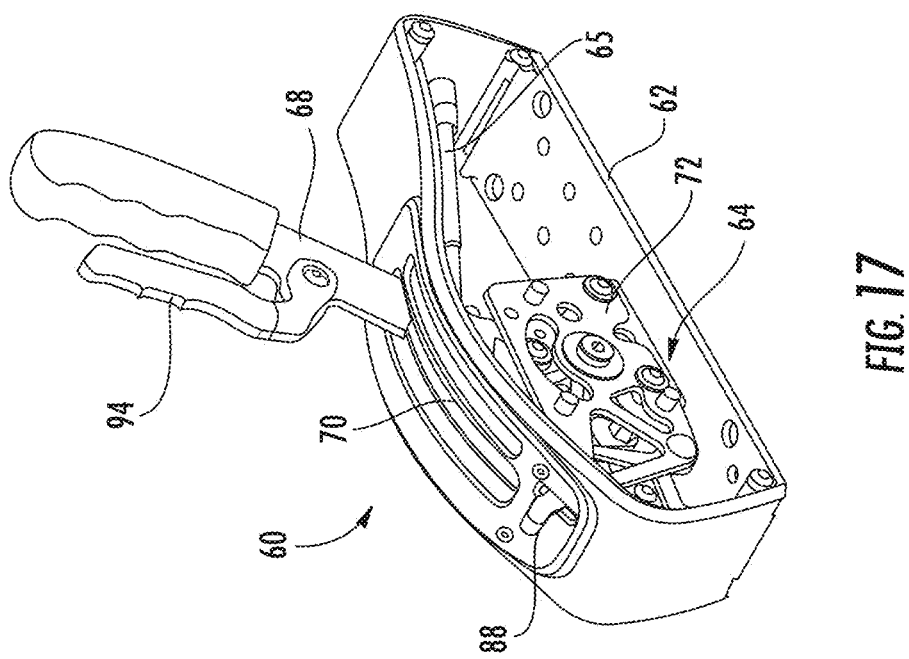
FIG. 17 is a front perspective view of the transmission shifter assembly of the present invention in another possible configuration thereof.

As previously noted, according to another unique feature of the present invention, the mounting of the shift mechanism 64 within its own base 66 enables the shift mechanism 64 to be mounted within the housing 62 with either end of the base 66 facing the cable opening 63 of the housing 62. Thus, as depicted in FIGS. 7-9 the shift mechanism 64 may be selectively mounted within the housing 62 in one orientation to accommodate mounting of the housing 62 within a vehicle to accommodate a forward extension, or front exit, of the transmission cable 65, or alternatively the shift mechanism 64 may be reversed as a unit one hundred eighty degrees for mounting within the housing 62 such that the opposite end of the base 66 faces the cable opening 63 allowing for a rearwardly extending rear exit of the transmission cable 65 within an automobile, as depicted in FIGS. 17 and 18. In such a rear exit configuration, the cable 65 is attached to the opposite stub shaft 102 on the handle 68 to facilitate the rearward extension of the cable 65. Thus, a front exit or rear exit of the transmission cable 65 can be utilized with any assembled configuration of the gate plates 74, 76 for any forward or reverse shift pattern.

As will thus be understood, the shifter assembly 60 of the present invention uniquely replaces multiple differing shifter assemblies made of prior art constructions without any difference in functionality. Advantageously, manufacturers can thereby reduce the number of differing parts that must be fabricated and inventoried, wholesalers and retailers need no longer purchase and stock multiple differing assembled units, and end users can readily reconfigure a single assembly to adapt to any of multiple differ transmissions, instead of the necessity in the past of purchasing a new shifter assembly for each different transmission.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A selectively configurable shifter assembly adapted for selective connection alternatively with any one of multiple automatic vehicle transmissions for shifting operation thereof, the shifter assembly comprising:
   a shift handle for manual movement between multiple shift positions,
   a control plate device forming a gate defining multiple stop locations each corresponding to a respective one of the shift positions, and
   a gate rod affixed to the shift handle for movement with the handle sequentially between the stop locations,
   wherein the control plate device comprises a first gate plate formed with a first gate portion and a second gate plate formed with a second gate portion,
   the first and second gate plates being selectively assemblable in at least a first configuration wherein the first and second gate portions cooperatively define a first set of stop locations defining a first gear shift pattern adapted to a first automatic vehicle transmission and a second configuration wherein the first and second gate portions cooperatively define a second set of stop locations defining a second gear shift pattern adapted to a second automatic vehicle transmission.

2. A selectively configurable shifter assembly according to claim 1, further comprising a base, the handle being pivotable relative to the base for pivoting movement between the shift positions.

3. A selectively configurable shifter assembly according to claim 2, wherein the gate plates are affixed to the base adjacent the handle.

4. A selectively configurable shifter assembly according to claim 3, wherein the gate plates are affixed in parallel facing relation to one another with the respective gate portions thereof in overlapping relation.

5. A selectively configurable shifter assembly according to claim 4, wherein, in the first configuration, the gate portions of the gate plates are oriented in a first overlapping relationship to one another and, in the second configuration, the gate portions of the gate plates are oriented in a second overlapping relationship to one another.

6. A selectively configurable shifter assembly according to claim 1 or 5, wherein the first and second gate plates are assemblable in a third configuration wherein the first and second gate portions cooperatively define a third set of stop locations defining a third gear shift pattern adapted to a third automatic vehicle transmission.

7. A selectively configurable shifter assembly according to claim 6, wherein, in the first configuration of the gate plates the gate portions define four stop locations corresponding to four forward gear settings of a four-speed automatic vehicle transmission, in the second configuration of the gate plates the gate portions define three stop locations corresponding to three forward gear settings of a three-speed automatic vehicle transmission, and in the third configuration of the gate plates the gate portions define two stop locations corresponding to two forward gear settings of a two-speed automatic vehicle transmission.

8. A selectively configurable shifter assembly according to claim 7, wherein, in each of the first, second and third configurations of the gate plates, the gate portions further define stop locations corresponding to park, reverse and neutral gear settings.

9. A selectively configurable shifter assembly according to claim 8, further comprising a mechanism engageable with the shift handle in each configuration of the gate plates to require manual disengagement before movement of the handle from one of the forward gear settings into the reverse gear setting.

10. A selectively configurable shifter assembly according to claim 1, further comprising a housing, the base being mounted within the housing and the handle extending outwardly through the housing.

11. A selectively configurable shifter assembly according to claim 10, wherein the housing includes an opening for receiving a cable for connecting the handle to the transmission.

12. A selectively configurable shifter assembly according to claim 10, wherein the base is selectively mountable within the housing in a first orientation wherein a first end of the base faces the cable-receiving opening to facilitate a first selective mounting disposition of the housing within a vehicle with the cable extending in a rearward direction through the housing and a second orientation wherein a second end of the base faces the cable-receiving opening to facilitate a second selective mounting disposition of the housing within a vehicle with the cable extending in a forward direction through the housing.

* * * * *